US008612721B2

(12) United States Patent  
Asano et al.

(10) Patent No.: US 8,612,721 B2  
(45) Date of Patent: Dec. 17, 2013

(54) SEMICONDUCTOR MEMORY CONTROLLING DEVICE

(75) Inventors: Shigehiro Asano, Kanagawa (JP); Shinichi Kanno, Tokyo (JP); Kenichiro Yoshii, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 373 days.

(21) Appl. No.: 13/037,970

(22) Filed: Mar. 1, 2011

(65) Prior Publication Data

US 2012/0072644 A1 Mar. 22, 2012

(30) Foreign Application Priority Data

Sep. 22, 2010 (JP) ................................. 2010-212646

(51) Int. Cl.  
*G06F 12/00* (2006.01)

(52) U.S. Cl.  
USPC ........... 711/206; 711/202; 711/208; 711/135; 711/E12.022

(58) Field of Classification Search  
None  
See application file for complete search history.

(56) References Cited

U.S. PATENT DOCUMENTS

| | | | |
|---|---|---|---|
| 4,972,338 A | 11/1990 | Crawford et al. | |
| 2004/0186946 A1 | 9/2004 | Lee | |
| 2009/0193193 A1 | 7/2009 | Kern | |
| 2009/0198902 A1 | 8/2009 | Khmelnitsky et al. | |
| 2009/0198947 A1 | 8/2009 | Khmelnitsky et al. | |
| 2009/0198952 A1 | 8/2009 | Khmelnitsky et al. | |

OTHER PUBLICATIONS

U.S. Appl. No. 13/217,461, filed Aug. 25, 2011, Asano, et al.  
U.S. Appl. No. 12/885,941, filed Sep. 20, 2010, Shigehiro Asano, et al.  
U.S. Appl. No. 12/888,822, filed Sep. 23, 2010, Shigehiro Asano, et al.  
U.S. Appl. No. 13/038,681, filed Mar. 2, 2011, Yao, et al.  
Extended Search Report issued Feb. 24, 2012 in European Patent Application No. 11177392.5-1229.  
Hyojun Kim, et al., "BPLUR: A Buffer Managament Scheme for Improving Random Writes in Flash Storage", Fast 08 Proceedings of the 6th USENIX Conference on File and Storage Technologies, Feb. 29, 2008, 14 pages.  
U.S. Appl. No. 12/883,796, Notice of Allowance, Apr. 17, 2013.  
U.S. Appl. No. 13/035,194, 1st Office Action, Jan. 23, 2013, 1st OA Resp (1st), May 22, 2013.  
U.S. Appl. No. 13/038,804, 1st Office Action, Mar. 27, 2013.  
U.S. Appl. No. 13/038,681, Final Rejection, Apr. 9, 2013.  
U.S. Appl. No. 13/218,812, Notice of Allowance, May 21, 2013.  
U.S. Appl. No. 13/601,707, 1st Office Action, Jan. 18, 2013, 1st OA Resp, Apr. 16, 2013.

*Primary Examiner* — Kevin Verbrugge  
*Assistant Examiner* — Arvind Talukdar  
(74) *Attorney, Agent, or Firm* — Oblon, Spivak, McClelland, Maier & Neustadt, L.L.P.

(57) ABSTRACT

According to one embodiment, upon request from an information processor, a semiconductor storage controller writes pieces of data in predetermined units into storage locations in which no data has been written in erased areas within a semiconductor chip's storage area. A third table and a second table which is a subset thereof include physical addresses each indicating a storage location of each of pieces of the data within the semiconductor chip. The first table includes either information specifying a second table entry or information specifying a third table entry. The semiconductor storage controller records the first and the second tables into a volatile memory or records the first table into a volatile memory and the third table into a nonvolatile memory.

6 Claims, 12 Drawing Sheets

SEMICONDUCTOR MEMORY CONTROLLING DEVICE

CROSS-REFERENCE TO RELATED APPLICATIONS

This application is based upon and claims the benefit of priority from Japanese Patent Application No. 2010-212646, filed on Sep. 22, 2010; the entire contents of which are incorporated herein by reference.

FIELD

Embodiments described herein relate generally to a semiconductor memory controlling device.

BACKGROUND

One of the most popularly used nonvolatile semiconductor memory chips is a flash memory of the NAND type (referred to as NAND flash memory). In a NAND flash memory, the smallest unit of recording is a page, and writing is performed in units of a page. It is possible to write data into a page, only after the data previously stored in the page has been erased. It is not possible to erase the data in units of a page. The data is erased in units (called "blocks") each of which is made up of a predetermined number (2 or more) of pages. In the case where the relationship between an address (hereinafter, a "logical address") that is specified when a host, which is an apparatus superordinate to a semiconductor memory chip, requests writing of data and a page (hereinafter, a "physical address") into which the data is written within the NAND flash memory is a fixed relationship, every time the host requests writing of data, the data in a block needs to be erased so that the new data can be written into the erased block. In this situation, the other pages (in the same block) on which the writing was not performed are also erased at the same time. To avoid this situation, it is possible to use a method by which the data stored in the pages to be erased is temporarily moved to another memory such as a Dynamic Random Access Memory (DRAM) so that, after the block has been erased, the data requested to be written and the data that has been moved to the other memory are written together into the block.

As explained above, in the case where the relationship between logical addresses and physical addresses is fixed, if the number of times writing processes have been performed is not well balanced among different logical addresses, the number of times writing process have been performed is not be well balanced among different physical addresses, either. Thus, there is a possibility that writing processes may be performed in a concentrated manner in a region with certain physical addresses. NAND flash memories have a characteristic where the element wears out when writing processes have been performed thereon a large number of times. Thus, there is a demand that the number of times writing processes are performed should be as uniform as possible throughout the entirety of the storage region so that the life span of the system can be kept long. To arrange the number of times writing processes are performed to be as uniform as possible throughout the entirety of the storage region, it is necessary to manage the number of times writing processes have been performed in each of sectional regions and to manage the relationship between the logical addresses and the physical addresses in such a manner that writing processes will be performed on some regions on which writing processes have been performed a smaller number of times.

To read the data that has been written by using the method described above in response to a request from the host, it is necessary to determine the storing position (i.e., the physical address) in which the data corresponding to the logical address specified by the host is actually stored within a NAND flash memory. For this purpose, it is necessary to prepare a translation table showing the association between the logical address and the physical address. To be efficient, the units that are used for indicating the association between logical addresses and physical addresses should preferably match the page size of the NAND flash memory; however, the page size may be, for example, 4 kilobytes and is relatively small. For example, in the case where a logical address space of 256 gigabytes is divided into sections of 4 kilobytes each, the translation table needs to have 64 mega entries. On an assumption that each of the entries in the translation table is 4 bytes in size, the translation table will require a capacity of 256 megabytes. It means that the size of the translation table is very large (see, for example, "A Buffer Management Scheme for Improving Random Writes in Flash Storage", http://www.usenix.org/events/fast08/tech/full_papers/kim/kim_html/).

Generally speaking, a Dynamic Random Access Memory (DRAM) or a Static Random Access Memory (SRAM), each of which has a high level of random accessibility, can be used for translation tables. In the case where the size of a translation table is large, a large part of the capacity of such a volatile memory is required. There is a possibility that making the capacity of a memory larger may lead to a cost-related problem. In addition, in the case where the entirety of the translation table is held in the NAND flash memory itself, every time the translation table is updated, a writing process is performed on the NAND flash memory. As a result, the number of times writing processes are performed on the NAND flash memory increases, and there is a possibility that reliability of the semiconductor memory system may become lower.

DETAILED DESCRIPTION

According to one embodiment, a semiconductor memory controlling device writes, into a semiconductor memory chip, host write data requested to be written with a specified logical address used by an information processing apparatus. The host write data includes one or more pieces of first data in predetermined units. A physical address is information indicating a storage location of the first data within the semiconductor memory chip. A first table is stored in a first memory. A second table is stored in a second memory. A third table is stored in a third memory which is a nonvolatile memory and includes physical addresses each of which indicates a storage location of each of pieces of the first data within the semiconductor memory chip. The second table is a subset of the third table and includes the physical addresses each of which indicates the storage location of each of pieces of the first data within the semiconductor memory chip. The first table includes either information specifying a second table entry or information specifying a third table entry. The semiconductor memory controlling device includes a receiving unit configured to receive the host write data; a controlling unit configured to write each of the pieces of the first data into a storage location in which no data has been written in a storage region from which data has been erased within a storage region of the semiconductor memory chip; and a recording unit configured to either record the first table into the volatile memory and the second table into the volatile memory, or record the first table into the volatile memory and the third table into the nonvolatile memory.

Various embodiments will be described hereinafter with reference to the accompanying drawings.

Figure 1:
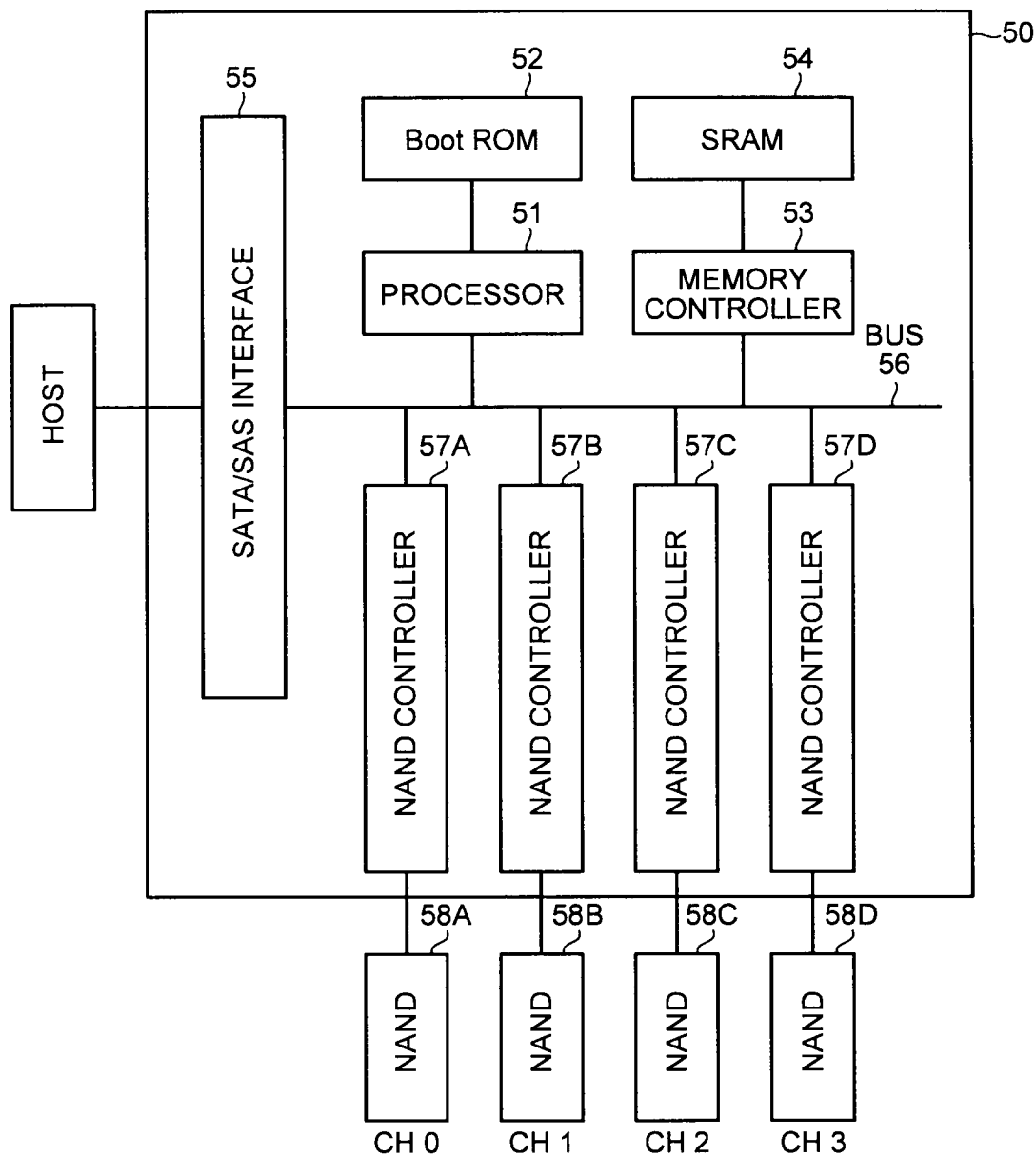
FIG. 1 is a drawing of an exemplary hardware configuration of a semiconductor memory system according to an embodiment.

First, a hardware configuration of a semiconductor memory system that includes a semiconductor memory controlling device according to an embodiment will be explained, with reference to FIG. 1. The semiconductor memory system is configured by connecting together a semiconductor memory controlling device 50 and semiconductor memory elements (NAND) 58A to 58D. The semiconductor memory controlling device 50 includes a processor 51, a boot Read Only Memory (ROM) 52, a Serial Advanced Technology Attachment/Serial Attached Small Computer System Interface [=SCSI] (SATA/SAS interface) 55, a memory controller 53, a Static Random Access Memory (SRAM) 54, NAND controllers 57A to 57D, and a bus 56 that connects these elements together. The NANDs 58A to 58D are connected to the NAND controllers 57A to 57D, respectively. In the situations where the NAND controllers 57A to 57D do not need to be distinguished from one another, the NAND controllers 57A to 57D may simply be referred to as the NAND controllers 57. Similarly, in the situations where the NANDs 58A to 58D do not need to be distinguished from one another, the NANDs 58A to 58D may simply be referred to as the NANDs 58.

Under control of the processor 51, the SATA/SAS interface 55 controls communication with a host, which is an apparatus superordinate to the semiconductor memory controlling device 50. The boot ROM 52 stores therein a program to be executed when the device is turned on. Various types of system programs are stored in the NANDs 58. The processor 51 controls the entirety of the semiconductor memory controlling device 50 and causes various types of functions to be realized by, when the device is turned on, reading the program from the boot ROM 52, executing the read program, transferring the various types of system programs stored in the NANDs 58 to the SRAM 54 according to the executed program, and executing the system programs in the SRAM 54. More specifically, the processor 51 interprets a command transmitted from the host via the SATA/SAS interface 55. The processor 51 controls writing of data into any of the NANDs 58 or reading of data from any of the NANDs 58, according to the command.

The memory controller 53 controls writing or reading to or from the SRAM 54. The SRAM 54 stores therein various types of data and various types of programs. According to the present embodiment, the SRAM 54 stores therein a part of a forward lookup table, which is explained later, as well as a bit vector table. Each of the NAND controllers 57 is configured so as to control the corresponding one of the NANDs 58 and includes an error correction circuit.

Each of the NANDs 58 corresponds to a semiconductor memory chip and is, for example, a memory element used in a NAND flash memory. From and to each of the NANDs 58, it is not possible to read and write data randomly, but it is possible to read and write data in units called "pages". A plurality of pages together form a unit of storage region called a "block". In the present example, one page is made of 4 kilobytes, and one block is formed by 64 pages. Each of the NANDs 58 is configured with a plurality of blocks that are put together. In the present embodiment, as shown in FIG. 1, the number of the NANDs 58 is four. Channels (CH0 to CH3) are allocated to the NANDs 58A to 58D, respectively. As will be explained later, in the case where data requested to be written by the host is larger than the size of a page (hereinafter, may be referred to as the "page size"), the semiconductor memory controlling device 50 divides the data into a plurality of pieces, and allocates and writes the pieces of data divided in pages (hereinafter, the "divided pieces of data") to the respective channels CH0 to CH3.

Here, a write method for writing data into the NANDs 58 will be explained. A NAND semiconductor memory element conventionally employs a log-structured method. According to a log-structured method, a block needs to be erased before writing. Erasure of a block is to erase the data stored in the block and is, for example, to set all bits in storage regions constituting the block to "1". The semiconductor memory controlling device 50 performs such erasure in units of a block and performs writing in units of a page to the erased block. Accordingly, in the NANDs 58, which are of a NAND type, data can be sequentially written to unwritten pages in an erased block, and written pages cannot be overwritten. Further, writing of data in response to a request from the host is specified by a logical address (i.e., logical block address (LBA)) used in the host. In contrast, writing of data into the NANDs 58 is performed according to physical storing positions (i.e., physical block address (PBA)) of the NANDs 58, in the ascending order of the pages in the block regardless of the logical address. In other words, no matter what logical address is specified in the data writing request, writing of data to the pages is performed in a predetermined order within the block. In the case where the size of writing target data is less than the page size, the data in the page containing the writing target portion is read and is merged with the writing target portion so as to match the page size, so that the writing is performed in units of a page. In the case where the data is larger than the page size, the data is sectioned into a plurality of pages and distributed to allocated blocks, so that the writing is performed in units of a page. The association between the logical address and the physical address is stored in the forward lookup table, which is explained later. When writing of new data is requested by the host with the logical address specified in the previous data request being specified again, the semiconductor memory controlling device 50 writes the new data to an unwritten page in an erased block. In this situation, the page to which writing corresponding to this logical address is previously performed changes the status thereof to "invalid" and the page to which the new data is written changes the status thereof to "valid".

In this situation, "invalid" is the status in which a logical address does not indicate the location of the physical address, whereas, "valid" is the status in which a logical address indicates the location of the physical address. Thus, when data is invalid, a logical address does not indicate the location of a physical address of a storage region, in which the data is stored. When data is valid, a logical address indicates the location of a physical address of a storage region, in which the data is stored. When a physical location of page is invalid, a logical address does not indicate the location of the physical address of a storage region, which corresponds to the page. When a page is valid, a logical address indicates the location of the physical address of a storage region, which corresponds to the page.

Figure 2:
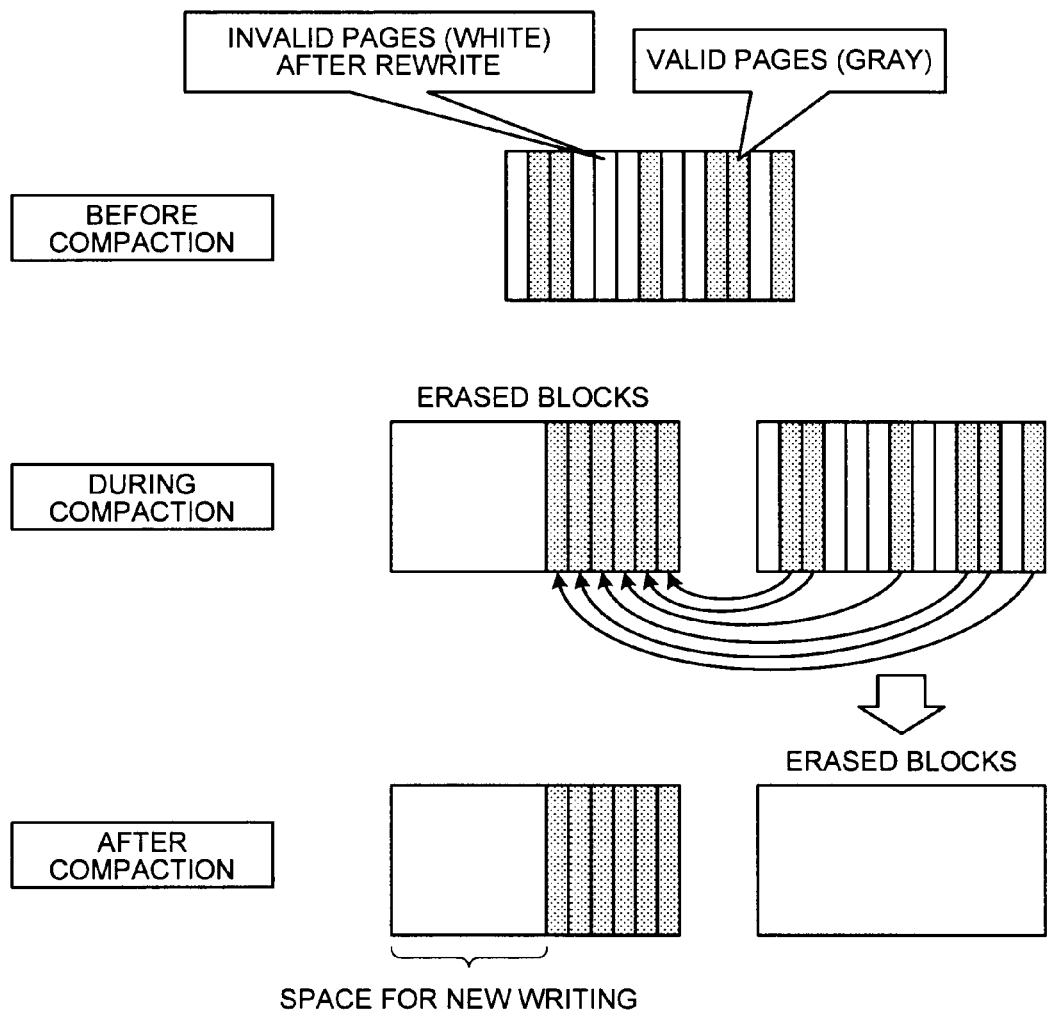
FIG. 2 is a conceptual drawing for explaining compaction.

According to the log-structured method, when the number of pages which are made invalid increases by continuing the writing, write realizable capacity (hereinafter, writable capacity) in the NANDs 58 becomes smaller. At the time point when the number of new erased blocks to which data can be written, that is, the number of blocks (hereinafter, "free blocks") to which data is not written yet after erasure decreases and a free block in each of the channels cannot be reserved, a write impossible state occurs. To prevent it, in the semiconductor memory controlling device 50, garbage collection is made at a proper timing. The garbage collection made in the NANDs 58 will be particularly called compaction. FIG. 2 is a conceptual drawing for explaining compaction. The semiconductor memory controlling device 50 collects data written in physical addresses (referred to as valid data) which are not made invalid in blocks containing the pages which are made invalid and newly rewrites the collected valid data in free blocks to move the valid data thereto. After that, the semiconductor memory controlling device 50 erases the blocks so as to generate a new free block. In the semiconductor memory controlling device 50, blocks that were unwritable become writable again by performing such compaction, allowing free blocks to be reserved. In addition, if there is an unwritten page in a block in which valid data is written as a result of moving data, data can be newly written to the page.

At least one free block is needed to perform such compaction, which means that the capacity (referred to as implemented capacity) implemented in the NANDs 58 is larger than the capacity at which writing can be actually realized. In the present embodiment, the difference between the implemented capacity and the writable capacity is referred to as "spare capacity". When the spare capacity is small, the semiconductor memory controlling device 50 has to frequently carry out compaction, which has a great impact on performance thereof.

Next, functions implemented in the semiconductor memory controlling device 50 will be explained, with reference to FIG. 3. The semiconductor memory controlling device 50 includes a host interface unit 60, a buffer controlling unit 61, an address translating unit 62, a channel (CH) allocating unit 63, a compaction candidate detecting unit 64, a management table updating unit 65, NAND controlling units 66A to 66D, a data buffer 67, a compaction read queue 68, and a management table 69. The function of the host interface unit 60 is realized by execution of the program by the processor 51 and the function of the SATA/SAS interface 55. The function of the address translating unit 62, the CH allocating unit 63, the management table updating unit 65, the compaction candidate detecting unit 64, and the buffer controlling unit 61 are implemented when the processor 51 executes the program. The function of the NAND controlling units 66A to 66D correspond to the NAND controllers 57A to 57D, respectively, and are implemented by execution of the program by the processor 51 and the functions of the NAND controllers 57A to 57D that correspond to the NAND controlling units 66A to 66D, respectively. The NAND controlling units 66A to 66D correspond to the NANDs 58A to 58D to which the channels CH0 to CH3 described above are allocated, respectively, in a one-to-one corresponding manner. In the situations where the NAND controlling units 66A to 66D do not need to be distinguished from one another, the NAND controlling units 66A to 66D may simply be referred to as the NAND controlling units 66. The data buffer 67 and the compaction read queue 68 are, for example, storage regions that are reserved in the SRAM 54. The management table 69 will be explained in detail later and is information stored in the SRAM 54 and in the NANDs 58.

The host interface unit 60 is an interface that controls communication between the host and the semiconductor memory controlling device 50. The host interface unit 60 receives a command transmitted from the host, and when the command requests writing of data with a specified logical address, the host interface unit 60 transmits the command (hereinafter, the "write command") to the address translating unit 62, which will be explained later. In that situation, when the size of the data requested to be written is equal to or less than the page size, the host interface unit 60 transmits the data to the buffer controlling unit 61, which will be explained later. When the size of the data is larger than the page size, the host interface unit 60 divides the data into pieces of units of a page, and transmits the pieces of data thus divided (hereinafter, the "divided pieces of data") to the buffer controlling unit 61. The reason is that translation between the logical address and the physical address is made in the page unit basis. For example, the host interface unit 60 divides data of 128 kilobyte into 32 pieces of 4-kilobyte data. The data or the divided pieces of data transmitted to the buffer controlling unit 61 in response to the write command will be referred to as writing target data, for the sake of convenience of the explanation.

In the case where a command transmitted from the host requests reading of data with specified logical address, if the size of the data requested to be read is equal to or less than the page size, the host interface unit 60 transmits the command (hereinafter, the "read command") to the address translating unit 62. In the case where the size of the data requested to be read is larger than the page size, the host interface unit 60 transmits a command (i.e., a read command) requesting reading of data on the page unit basis to the address translating unit 62. In this situation, the host interface unit 60 calculates the logical addresses of each of the pieces of data to be read by using the logical address specified by the command transmitted from the host, and transmits the read command requesting to read data with the calculated logical address to the address translating unit 62. Further, the host interface unit 60 reads the data to be read which is stored in a designated region in the data buffer 67 by using the buffer controlling unit 61, which will be explained later, and transmits it to the host.

The management table 69 includes the forward lookup table and the bit vector table. The forward lookup table indicates an association between the logical address of data and the physical address indicating a physical storage location in which the data is written in the NANDs 58. Such a forward lookup table is used at the time of specifying the physical address that indicates the storage location on the NANDs 58 in which data corresponding to the logical address specified by the host is stored.

Figure 4:
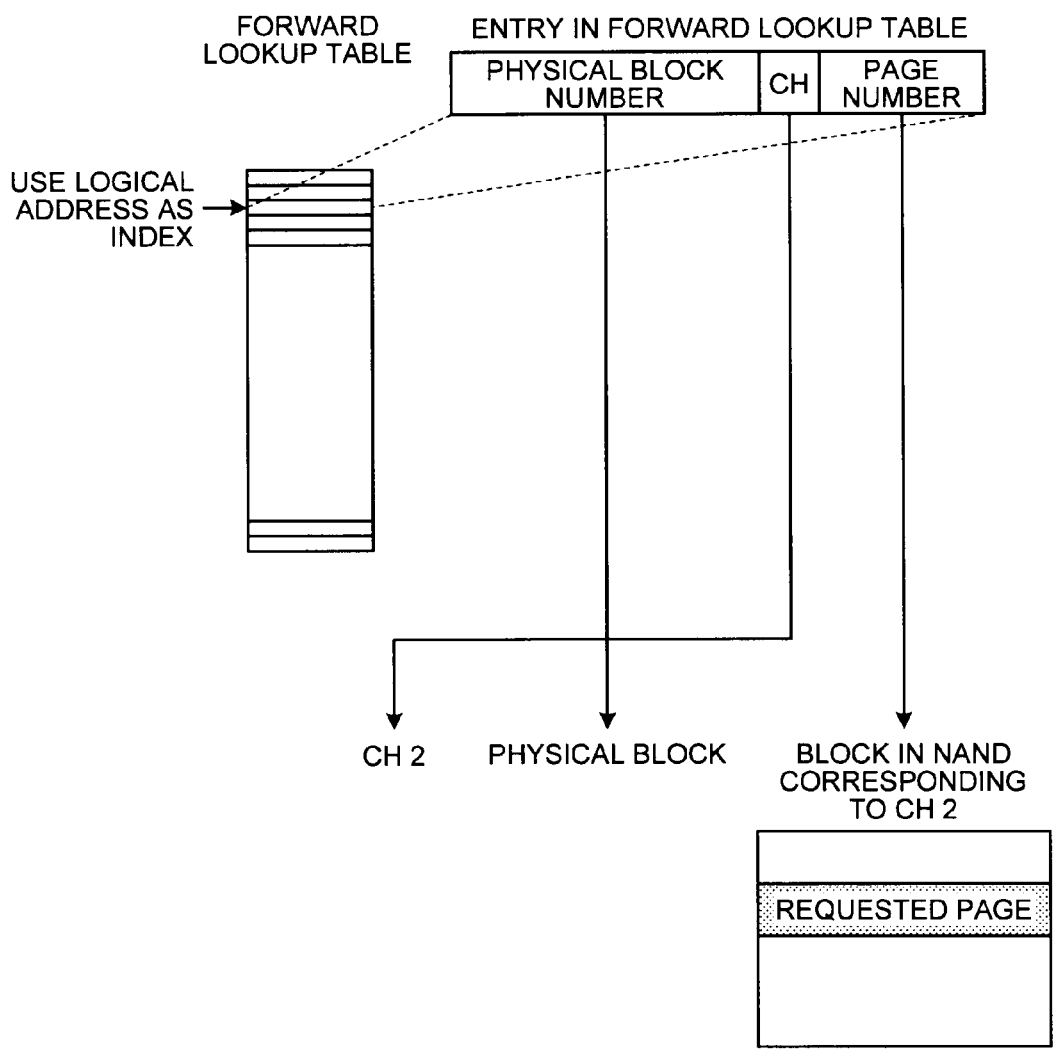
FIG. 4 is a drawing of an exemplary data structure of a forward lookup table.

FIG. 4 is a conceptual drawing of a data structure of the forward lookup table. As shown in FIG. 4, the forward lookup table uses a logical address as an index, and includes entries including a number given to a channel (channel number), a number given to a physical block (physical block number), and a page number given to a page. The logical address of each of the pieces of data is calculated on the basis of a logical address specified in a data writing request from the host. The channel numbers are CH0 to CH3 in this embodiment. The channel number indicates to which channel the NANDs 58 including the physical block in which data corresponding to the logical address is stored is connected. The page number indicates that the data corresponding to the logical address is stored in which page in the physical block identified by the channel number and the physical block number. The page number may be given in the order of the physical addresses, or the physical address itself may be given as the page number, for example.

The forward lookup table is referred to every time data is read and is updated every time data is written in the NAND 58 in response to a request from the host or in response to a compaction. How the forward lookup table is referred to and updated will be explained later. Because the frequency with which the forward lookup table is referred to and updated is high, the forward lookup table is installed by, generally speaking, using a volatile memory such as a DRAM or a SRAM. However, for example, in the case where a NAND 58 having a capacity of 256 gigabytes is managed in units of a section of 4 kilobytes, it is necessary to have a forward lookup table that has entries of which the number is 64 mega (=256 giga/4K). If each of the entries in the forward lookup table is 4 bytes in size, it is necessary to install a volatile memory having a total capacity of "256 megabytes (=64 mega*4 bytes)". Further, to realize each of the NANDs 58 with a larger capacity, there will be a constraint where it is necessary to install a volatile memory having a capacity in proportion to the larger capacity. According to the present embodiment, it is possible to suppress the costs by reducing the capacity of the volatile memory and structuring the forward lookup table by using, in combination, the NANDs 58, which have a lower price per capacity than volatile memories, and a volatile memory. That is, according to the embodiment, as the forward lookup table, the information indicating the association between the logical addresses and the physical addresses is partially stored in the SRAM 54 and is partially stored into the NANDs 58. As a result, it is possible to reduce the capacity of the volatile memory that is required to structure the forward lookup table.

Figure 5:
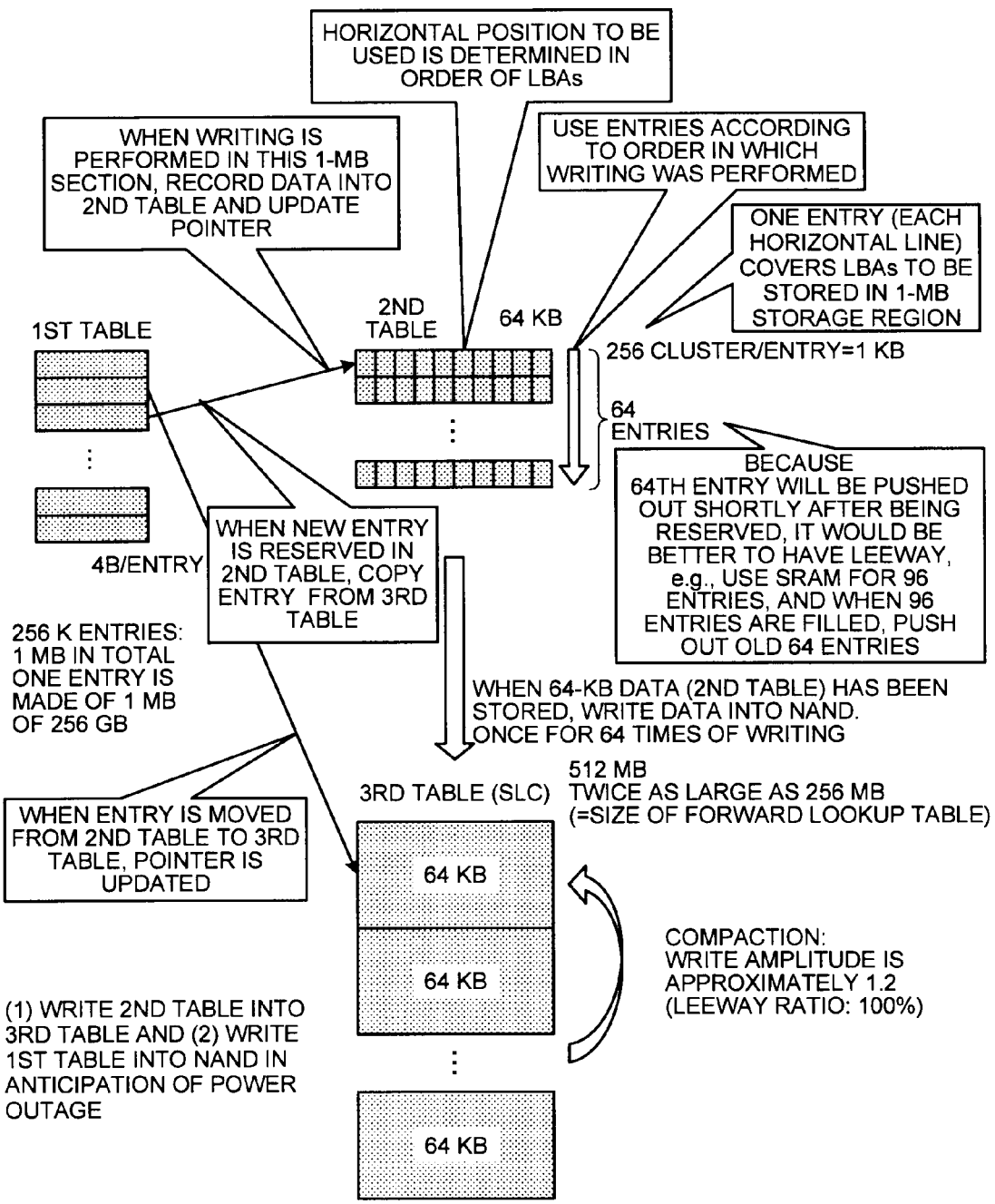
FIG. 5 is a schematic drawing of a structure of a forward lookup table according to the embodiment.
Figure 6:
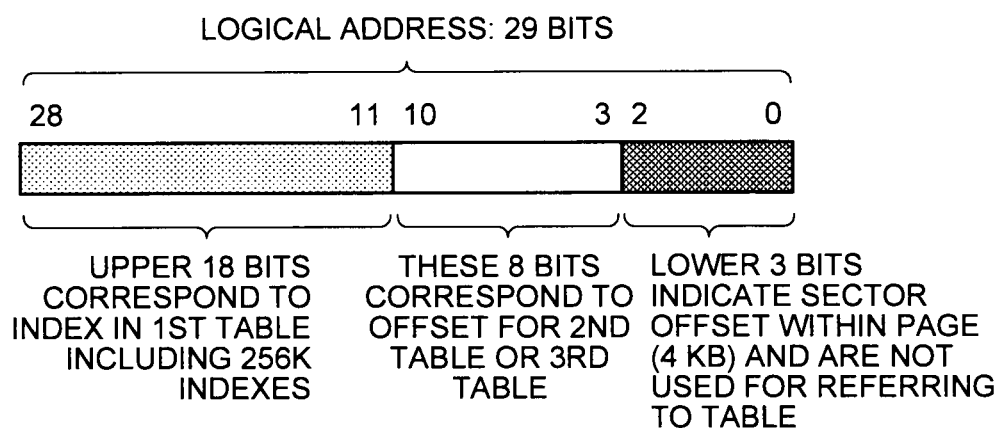
FIG. 6 is a drawing for explaining a relationship between a logical address and a data structure of a first table.

More specifically, the forward lookup table is constituted by a first table and a second table that are stored in the volatile memory and by a third table that is stored in the NANDs 58. The first table and the second table may be stored in a volatile memory such as DRAM or SRAM, or a nonvolatile memory such as MRAM or FeRAM. The second table is information including physical addresses each of which indicates a storage location of data within the NAND 58. The third table is information including physical addresses each of which indicates a storage location of data within the NAND 58. The first table includes either (i) information specifying a second table entry, or (ii) information specifying a third table entry. A part of bits of a logical address (from the 11th bit through the 28th bit) as shown in FIG. 6 is used as an index in the first table, and a part of the remaining bits (from the 3rd bit through the 10th bit) is used as indexes indicating positions in an entry of the second table or the third table specified by a value of the first table. FIG. 5 is a schematic drawing of a structure of the forward lookup table according to the embodiment. In the first table, a storage region is divided into sections in units of chunks. A storage region corresponding to one chunk is allocated as one entry. As an example, in the case where one chunk is 1 megabyte and one entry is 4 bytes in size, the capacity of the first table with respect to a 256-gigabyte NAND 58 can be calculated as "256 gigabytes/1 megabyte*4 bytes=1 megabyte". More specifically, as shown in FIG. 6, each of the entries in the first table shows the upper 18 bits of a logical address being associated with specifying information that specifies a storage region that stores therein a physical address corresponding to the logical address within a storage region that stores therein the second table, or being associated with specifying information that specifies a storage region that stores therein a physical address corresponding to the logical address within a storage region that stores therein the third table. The number of the entries is 256K. As for a logical address whose corresponding data has not been accessed, a value "FFFFFFFF" is given as the specifying information. It means that there is no corresponding entry in the second table or in the third table. It should be noted that, because only 29 bits are used as a logical address, there is no possibility that an entry that has previously been accessed shows this value.

Figure 7:
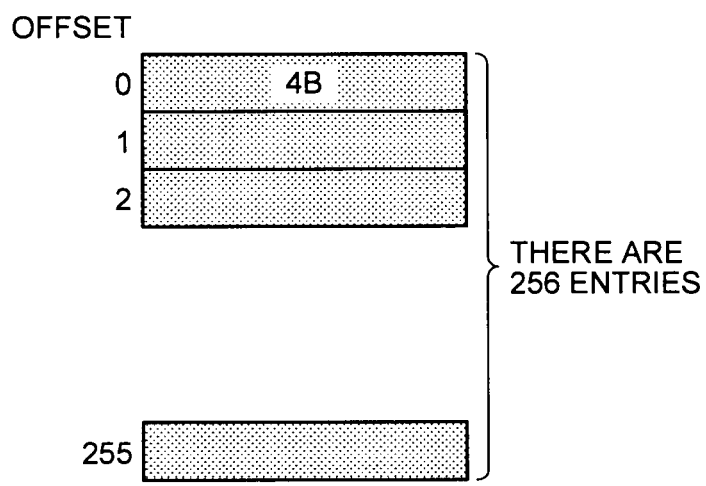
FIG. 7 is a drawing of an example of a structure of a third table.

In the storage region that stores therein the third table, information of the entries is stored in units of a page via the second table, which is explained below. FIG. 7 is a drawing of an example of a structure of the third table. Each of the entries in the third table is uniquely selected with the upper 18 bits of a logical address, which is the index in the first table. The middle 8 bits from the third bit through the tenth bit specifies one of 256 cluster positions included in a 1-megabyte chunk, so that a physical address corresponding to the logical address is stored in the specified position. The number of sub-entries of the third table is 256 per each entry of the first table, because there are 256 4-kilobyte clusters and one chunk is 1 megabyte in size (1 megabyte/4 kilobytes=256). In each of the entries of the first table, specifying information that specifies one storage region is shown in correspondence with the upper 18 bits of a logical address. In the third table, 256 physical addresses are arranged in the order of the logical addresses in this one storage region. The middle 8 bits from the third bit through the tenth bit in a logical address is used as an offset which specifies one of the sub-entries, so that a physical address is stored in the 4 bytes in a storage location (address) corresponding to the offset. Pieces of information of the entries in the third table are written into a plurality of NANDs 58 in a round-robin manner. By configuring the third table, it is possible to reduce the overhead that is caused by writing data into the third table and that affects the processing speed. The third table does not contain any physical addresses of such data that has not been accessed. Thus, it is not that the third table shows the association between the logical addresses and the physical addresses of all of data capable of being written within the capacity of the NANDs 58.

The second table is a subset of the third table and functions as a cache of the third table. The second table is constituted by using a volatile memory such as the SRAM 54 or a DRAM (not shown). The capacity of the second table is equal to or less than the capacity of the third table. An entry of the first table is uniquely selected with the upper 18 bits of a logical address, which is the index in the first table. An entry of the second table specified with the selected entry of the first table is selected. The middle 8 bits from the third bit through the tenth bit specifies positions in the selected entry of the second table. For example, the middle 8 bits specifies positions of the 256 clusters included in a 1-megabyte chunk. A physical address corresponding to the logical address is stored in the specified position. In the second table, as shown in FIG. 7, in the same manner as in the third table, physical addresses are arranged in the order of the logical addresses in the storage region specified by the specifying information corresponding to the upper 18 bits of the logical address in one entry of the first table. The middle 8 bits from the third bit through the tenth bit in a logical address is used as an offset, so that a physical address is stored in the 4 bytes in a storing location (address) corresponding to the offset. Every time a predetermined condition is satisfied, pieces of information of the entries in the second table are written into the storage region that stores therein the third table. The predetermined condition may be, for example, that the size of a plurality of entries that have been written into the storage region that stores therein the second table becomes equal to 4 kilobytes, which is the page size, or a multiple thereof (e.g., 64 kilobytes). Because writing of data into the storage region that stores therein the third table is writing of data into the NAND 58, even if the electric power source of the semiconductor memory controlling device 50 is turned off, the association between the logical addresses and the physical addresses is held. Further, because one entry of the second table is 1 kilobyte in size and the page size of the NAND 58 is 4 kilobytes, four writing processes correspond to writing of data of one page into the NAND 58, even in a worst case. Thus, compared to the situation where the third table gets updated for every writing process, it is possible to reduce the number of times writing processes that are performed on the storage region that stores therein the third table, which is stored in the NAND 58.

Figure 8:
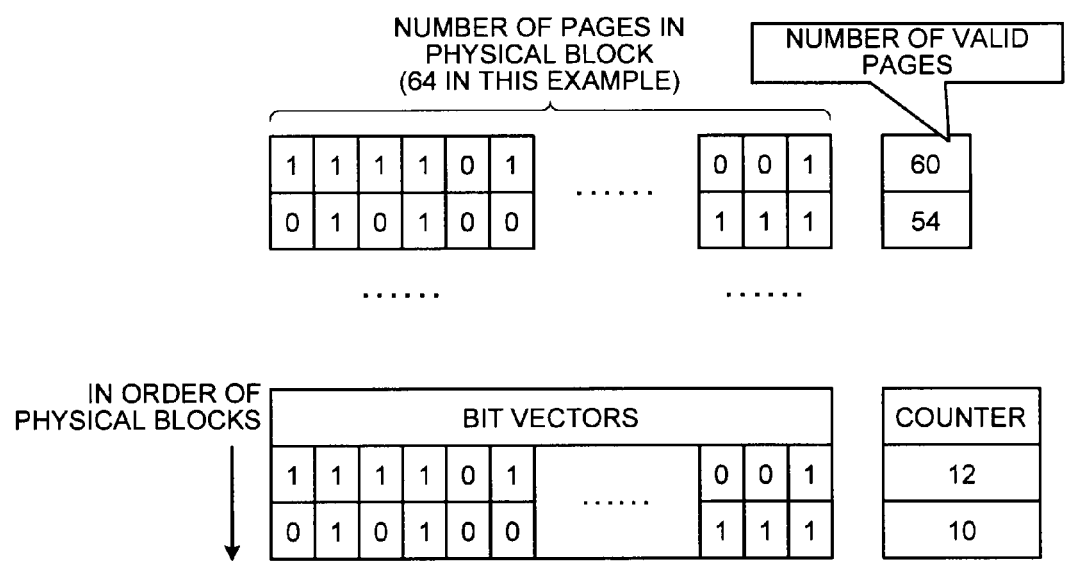
FIG. 8 is a drawing of an exemplary data structure of a bit vector table.

Next, the bit vector table will be explained with reference to FIG. 8. The bit vector table is a table showing, that, in binary in the order of pages, which pages are valid pages in each of the physical blocks on each of the channels CH0 to CH3. The valid page means a page into which valid data has been written. The binary indication for each page is referred to as a bit vector. When the value of the bit vector is "1", it means that the page is a valid page, and when the value of a bit vector is "0", it means that the page is not a valid page (invalid). In the initial state, the values of bit vectors are all set to "0".

In the present embodiment, channels to which writing target data is written are the four channels CH0 to CH3, and if it is assumed that one physical block includes 64 pages, the number of corresponding bit vectors is 64. As shown in FIG. 8, in the bit vector table, the physical block numbers for the channels CH0 to CH3 are used as indexes. The bit vector table includes, for each physical block, a physical block number, the bit vectors associated with each page included in each of the physical blocks, and a counter. In the example shown in FIG. 8, the bit vectors are arranged in the sequence of the pages of each of the physical blocks of the channels CH0 to CH3 in such a manner that, from left, the first page, the second page, ..., and the last page of the channel CH0, and in the next line, the first page, the second page, ..., and the last page of the channel CH1, and so on. The counter represents the total number of bit vectors whose values are "1". Because a page whose corresponding bit vector has a value "1" is a valid page, the counter represents the number of valid pages in a logical block (hereinafter, the "valid page counter"). In such a configuration, the bit vector table is updated every time the host requests writing of data. How the bit vector table is updated will be explained later.

Figure 3:
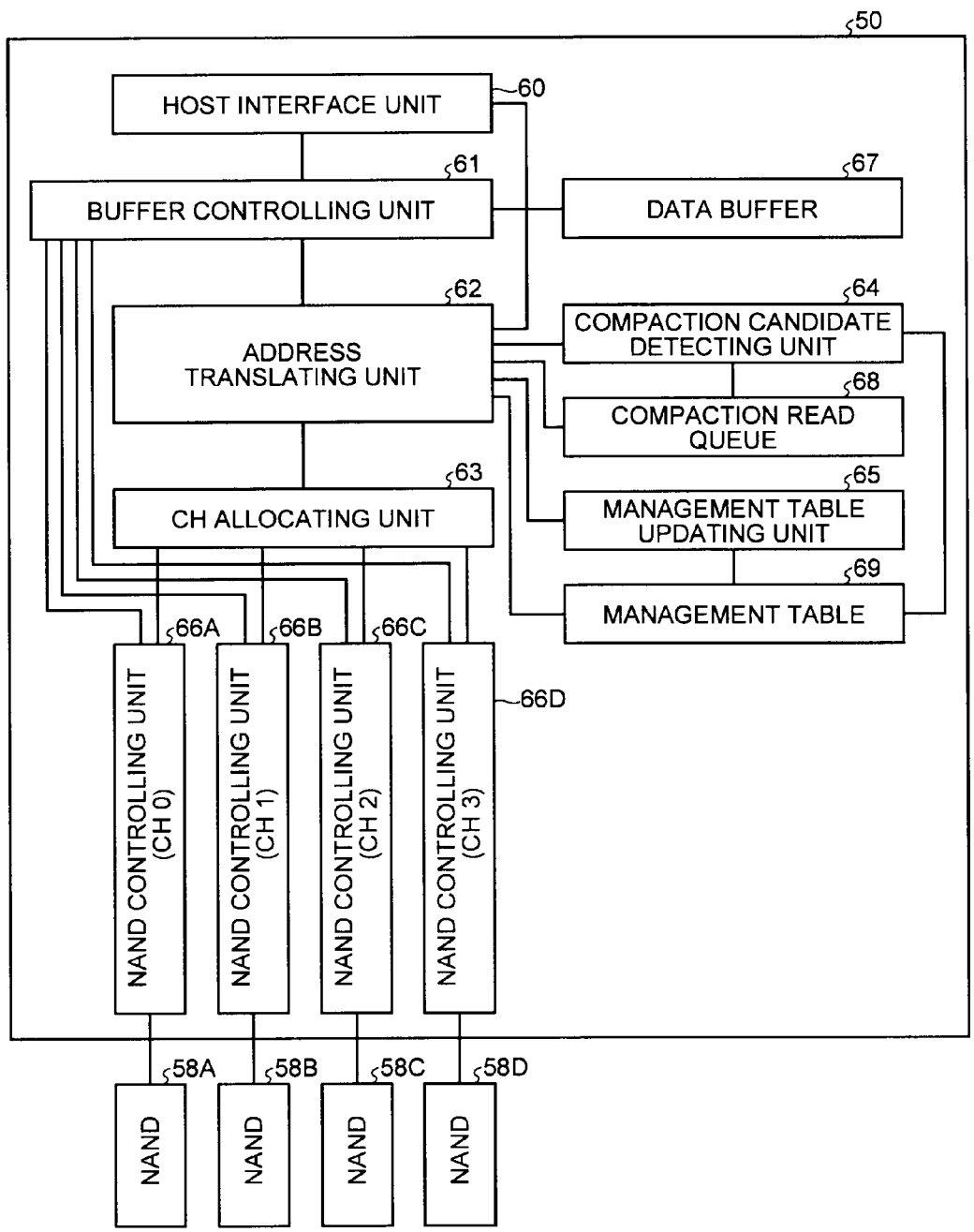
FIG. 3 is a diagram of examples of functions realized by a semiconductor memory controlling device 50.

Returning to the description of FIG. 3, the address translating unit 62 receives a command from the host interface unit 60. In the case where the command is a read command, the address translating unit 62 refers to the forward lookup table in the management table 69 by using the logical address specified by the received read command, and determines a channel and a physical address of a page in which data requested to be read by the read command is written. More specifically, the address translating unit 62 refers to the entries in the first table by using the upper 18 bits of the logical address and determines, while using the specifying information associated with the upper 18 bits of the logical address, whether the association between the logical address and the physical address is stored in the storage region that stores therein the second table or in the storage region that stores therein the third table. Depending on the result of the judgment, the address translating unit 62 reads the physical address that corresponds to the logical address either from the storage region that stores therein the second table or from the storage region that stores therein the third table, and determines the channel and the physical address.

Subsequently, the address translating unit 62 specifies a channel and a physical address that have been determined and transmits a command requesting to read data to the corresponding NAND controlling unit 66 via the CH allocating unit 63. In contrast, in the case where the command received from the host interface unit 60 is a write command, the address translating unit 62 transmits the write command to the CH allocating unit 63, which will be explained later.

In response to a compaction read command that is transmitted from the compaction candidate detecting unit 64 which will be explained later and then stored in the compaction read queue 68 which will be explained later, the address translating unit 62 transmits a command requesting to read data (valid data) in a valid page with a physical address specified by the compaction read command to the NAND controlling unit 66 corresponding to the channel to which the NAND 58 including the physical block including the valid data is connected, by referring to the forward lookup table. The valid data is read from the NAND 58 via the NAND controlling unit 66 and is stored into the data buffer 67 via the buffer controlling unit 61. The address translating unit 62 transmits the command requesting to write the valid data (referred to as compaction write command) to the CH allocating unit 63.

The CH allocating unit 63 receives the command from the address translating unit 62, and in the case where the command is a write command, determines the channel to which the writing target data is to be written. For example, the CH allocating unit 63 performs writing operation in round-robin manner in 4 kilobytes in channels and determines the channel to which data is written in accordance with the order of round robin. After that, the CH allocating unit 63 transmits a command requesting to write the writing target data to the NAND controlling unit 66 corresponding to the determined channel. In contrast, in the case where the reading of data is requested with a specified channel and a specified physical address by a command from the address translating unit 62, a command requesting to read data with the specified physical address is transmitted to the NAND controlling unit 66 corresponding to the designated channel. As another example, in the case where a command received from the address translating unit 62 is a compaction write command, the CH allocating unit 63 determines a channel to which data is to be written in accordance with the order of round robin and transmits a command requesting to write valid data to the NAND controlling unit 66 corresponding to the determined channel.

The NAND controlling unit 66 receives the command from the CH allocating unit 63 and accesses the corresponding NAND 58 according to the received command. More specifically, in the case where the command requests to write data, the NAND controlling unit 66 obtains writing target data via the buffer controlling unit 61 and writes the writing target data into the NAND 58. In the writing, the NAND controlling unit 66 sets a write pointer so as to sequentially point a write storage location, page by page, out of unwritten page in an erased block in the corresponding NAND 58, writes the writing target data into a page at a storage location pointed by the write pointer, and then updates the write pointer so as to point the storage location of an unwritten page that is the next page subsequent to the page subjected to the writing. Accordingly, the value of the write pointer changes so as to sequentially point the next write storage location. For example, in the case where a block is identified by a physical address of 15 bits in each channel and the block includes 64 pages (6 bits), the write pointer has 15+6=21 bits in total.

Figure 9:
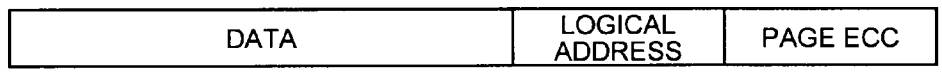
FIG. 9 is a drawing of an example of writing target data.

Here, the data structure of writing target data will now be explained. The NAND controlling unit 66 adds, to the writing target data, an error correction code (referred to as page ECC) for detecting and correcting an error of the writing target data itself and a logical address specified by a write command. It is assumed that the page ECC includes codes such as a Cyclic Redundancy Check (CRC) code for detecting an error in data and an Error Correcting Code (ECC) to correct the data error. FIG. 9 is a drawing of an example of writing target data to which a page ECC is added. In the NANDs 58 of the channels determined as described above, the NAND controlling unit 66 writes the writing target data to which such a page ECC and the logical address are added to a page pointed by the write pointer in the NAND 58 in each channel determined as described above. The writing target data has a size in a unit of pages. It is assumed that the page size of the NAND 58 equals the size of the entire data including the writing target data and the added page ECC and the logical address. The logical address of each of divided pieces of data is calculated by each NAND controlling unit 66, based on the basis of the logical address specified by the write command.

Figure 10:
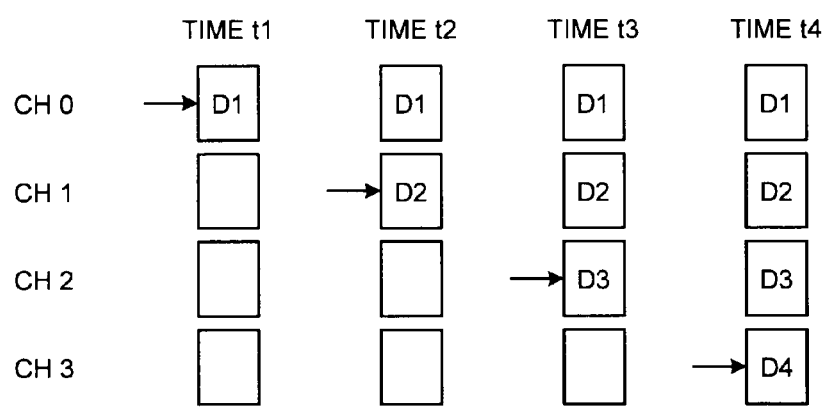
FIG. 10 is a drawing for explaining writing performed by round-robin processing.

Next, writing of a plurality of divided pieces of data as writing target data to the channels CH0 to CH3 by round-robin processing will be explained. FIG. 10 is a drawing for explaining writing performed by the round-robin processing. For simplification of the drawing, the logical addresses added to the divided pieces of data are not shown. As shown in FIG. 10, the divided pieces of data is written sequentially in the round-robin manner from the channel CH0 to the channel CH 3 in a manner such that first divided data D1 is written to the channel CH0 at time T1 and the next divided data D2 is written to the channel CH1 at time T2. At a time of further writing of divided pieces of data, the data is written sequentially in the round-robin manner from the channel CH0. By writing the divided pieces of data in the round-robin manner, writing operation of the channels are uniformly performed. In the example shown in FIG. 10, a state where data is written in order of the channels with lapse to time is shown. However, the present embodiment is not limited to this example. Data may be written simultaneously to two or more channels.

Returning to the description of FIG. 3, in the case where the command received from the address translating unit 62 requests to read data in a valid page (valid data) with a specified physical address, the NAND controlling unit 66 reads, by using the physical address, the data written in a page corresponding to the physical address in the NAND 58, and transmits the read data to the buffer controlling unit 61 so that the data is stored into the data buffer 67. If there is an error in the data read from the NAND 58, the NAND controlling unit 66 detects the error and corrects it. A method of detecting and correcting an error in data will be explained later. In the case where the command received from the CH allocating unit 63 requests to write data, the NAND controlling unit 66 retrieves writing target data via the buffer controlling unit 61 and writes the valid data to the NAND 58.

The compaction candidate detecting unit 64 refers to the bit vector table included in the management table 69, determines a logical block to be a candidate for compaction, and transmits a command (referred to as compaction read command) specifying the physical address of a valid page in the block and requesting to read the valid page to the compaction read queue 68.

The data buffer 67 is a buffer for storing therein the writing target data or the read data. The compaction read queue 68 is a first-in first-out buffer that stores therein a command requesting to read a valid page for compaction.

The buffer controlling unit 61 manages the data buffer 67 as a plurality of regions and manages the regions in which data corresponding to the command are stored. More specifically, the buffer controlling unit 61 stores, into the data buffer 67, the writing target data transmitted from the host interface unit 60 in response to a write command, and transmits the writing target data to the NAND controlling unit 66 corresponding to the channel determined to be written by the CH allocating unit 63. The writing target data is then written in the NAND 58 via the NAND controlling unit 66. The buffer controlling unit 61 stores the data transmitted from the NAND controlling unit 66 into a specified region in the data buffer 67 in response to the read command, and then transmits the data to the host interface unit 60. The data is transmitted to the host via the host interface unit 60. In response to a compaction read command, the buffer controlling unit 61 stores data read from the NAND 58 via the corresponding NAND controlling unit 66 into the data buffer 67.

In the case where a command (write command) requesting to write data with a specified logical address is received from the host, the management table updating unit 65 refers to the forward lookup table, and also, updates the bit vector table, and further updates the forward lookup table. More specifically, the management table updating unit 65 first refers to the forward lookup table to look up in which page in which block the data associated with the physical address corresponding to the logical address, namely, the data associated with the logical address, is written. In this situation, the management table updating unit 65 refers to an entry in the first table in the forward lookup table by using the upper 18 bits of the logical address and determines, while using the specifying information being associated with the upper 18 bits of the logical address, whether the association between the logical address and the physical address is stored in the storage region that stores therein the second table, or is stored in the storage region that stores therein the third table. In the case where the specifying information corresponding to the upper 18 bits of the logical address indicates the value "FFFFFFFF", in other words, in the case where the association between the logical address and the physical address is not stored in either one of the storage region that stores therein the second table and the storage region that stores therein the third table, it means that data of the logical address has not been written until this time. Note that, if the specifying information indicates the value "FFFFFFFF" in the reading, it is an error. In that situation, the management table updating unit 65 updates the first table in such a manner that the first table includes information indicating the upper 18 bits of the logical address being associated with the specifying information that specifies the storage region that stores therein the second table that stores the physical address corresponding to the logical address. Further, the management table updating unit 65 records an entry corresponding to the logical address into the storage region that stores therein the second table. In other words, the management table updating unit 65 uses the middle 8 bits from the third bit through the tenth bit of the logical address as an offset, and writes, into the storage region that stores therein the second table, the physical address corresponding to the logical address into the 4 bytes in the storage location (address) corresponding to the offset so as to record the entry into the storage region that stores therein the second table. Further, the management table updating unit 65 sets the value of the bit vector corresponding to the page to which the writing target data is to be written in the bit vector table to "1". The page to which the writing target data is to be written, namely, the physical address, is pointed by the write pointer. After that, the management table updating unit 65 increments the value of a counter of the number of valid pages in the physical block including the page by 1.

In contrast, in the case where the specifying information in an entry in the first table indicates that the association between the logical address and the physical address with respect to the upper 18 bits of the logical address is shown in one of the second and the third tables, it means data has previously been written into a storage region (1 megabyte) corresponding to the logical address of the data. In the case where the association between the logical address and the physical address is shown in the second table, the management table updating unit 65 does not update the first table, but records, within the second table, the physical address at which the writing target data is to be written into the entry corresponding to the logical address. In the case where the association between the logical address and the physical address is shown in the third table, the management table updating unit 65 records the entry showing the physical address that corresponds to the logical address within the storage region that stores therein the third table into the storage region that stores therein the second table, so as to move each entry stored in the storage region from the third table to the second table. Further, the management table updating unit 65 updates the corresponding entry in the second table with the physical address of the writing target. After that, the management table updating unit 65 updates the first table by, within the first table, associating the upper 18 bits of a logical address corresponding to each physical address shown in the entries with the specifying information indicating the storage location within the second table that stores therein the physical address being the moving destination. The page into which the writing target data is written, namely, the physical address is indicated by the write pointer.

In the case where the association between the logical address and the physical address is shown in one of the second and the third tables, it is necessary to invalidate the data written before because of the write command for the present writing. In this situation, the management table updating unit 65 sets the value of the bit vector corresponding to the page at the physical address stored in the entries of the forward lookup table referred to for the logical address specified by the write command to "0". In addition, the management table updating unit 65 decrements the value of a counter of the number of valid pages in the physical block that includes the page by 1. Further, the management table updating unit 65 sets the value of the bit vector corresponding to the page to which the writing target data is to be written to "1" and increments the value of a counter of the number of valid pages corresponding to the physical block that includes the page by 1. By performing updating each time writing of data is performed, the bit vector table and the counter of the number of valid pages always indicate the storage locations of valid pages and the number thereof.

Because the second table functions as a cache as mentioned above, cache region is restricted like commonly-used caches, and it is therefore necessary to keep the capacity of the cache within a predetermined volume. When the cache region has exceeded a predetermined level, it is necessary to push out some of the entries and to reserve a new region. The pushing out of the entries from the second table into the third table is performed by the management table updating unit 65. The method used for selecting the entries to be pushed out may be a Least Recently Used (LRU) algorithm that is well known to be used with conventional caches or a First-In First-Out (FIFO) algorithm by which the oldest entry is selected and pushed out. The pushing out (writing) of the entries from the second table into the third table is performed in accordance with the writing size of each of the NANDs 58. For example, in the case where data made of 64 kilobytes, which is 16 times larger than the 4-kilobyte page size, is used as a unit in which the pushing out is performed, 64 entries are pushed out at one time because each of the entries in the second table is made of 1 kilobyte. The pushed out data is recorded into the storage region that stores therein the third table in units of pages by using the log-structured method. In this example, 16 pages are written at one time. When having selected candidate entries to be pushed out from the second table, the management table updating unit 65 merges the entries being the candidates for the pushing out with the recorded contents that are already stored in the 64 entries to be written into the third table and writes the result of the merging into a new storage region of the third table. The merging process is performed on a 1-kilobyte unit basis. In this situation, the management table updating unit 65 updates the corresponding entry in the first table in such a manner that the entry in the first table showing the upper 18 bits of the logical address having been associated with the physical address indicated by the entry pushed out from the second table is associated with the specifying information that specifies the storage region that stores therein the physical address corresponding to the logical address within the storage region that stores therein the third table. It is desirably that the entries in the third table be stored in two or more of the NANDs 58, instead of in one NAND 58. In other words, although the management table updating unit 65 writes data into a 64-kilobyte storage region in one of the NANDs 58 at one time of pushing out, the writing is performed in units of 4 kilobytes on the NANDs 58 that have been determined as the writing target NANDs 58 in a round-robin manner. With this arrangement, with regard to the writing of data into the third table, it is possible to ensure that the writing operations are uniformly performed on the plurality of NANDs 58.

Next, procedures of processes performed by the semiconductor memory controlling device 50 according to the present embodiment will be explained. First, procedures of writing the writing target data in the NAND 58 by the semiconductor memory controlling device 50 in response to a write command from a host will be explained with reference to FIG. 11. Before starting the writing, the semiconductor memory controlling device 50 reserves, in advance, a physical block being a free block for each of the channels. Further, the semiconductor memory controlling device 50 sets the write pointer of each channel so as to point the first page of the physical block at the head of the channel. When a write command requesting to write data with a specified logical address is received from the host (step S1), the semiconductor memory controlling device 50 determines whether the size of data requested to be written by the write command is equal to or less than the page size or not (step S2). In the case where the size of the data is equal to or less than the page size (YES in step S2), the semiconductor memory controlling device 50 stores the data (writing target data) in the data buffer 67 (step S4). In contrast, in the case where the size of data requested to be written by the write command is larger than the page size (NO in step S2), the semiconductor memory controlling device 50 divides the data into pieces in units of a page (step S3) and records the divided pieces of data (writing target data) into the data buffer 67 (step S4).

Subsequently, the semiconductor memory controlling device 50 refers to the forward lookup table on the basis of a logical address specified by the write command, and when a physical address corresponding to the logical address of the writing target data is already recorded therein, stores the physical address as an old physical address in, for example, the SRAM 54 (step S5) in order to update the bit vector table. Further, the semiconductor memory controlling device 50 determines channels to which the writing target data is to be written in round-robin manner (step S6), and writes the writing target data with a page ECC and the logical address added thereto to a page pointed by the write pointer in the NAND 58 of the determined channel (step S7). After that, the semiconductor memory controlling device 50 updates the write pointer of each channel to point a next unwritten page following the page to which the writing target data is written (step S8).

Figure 12:
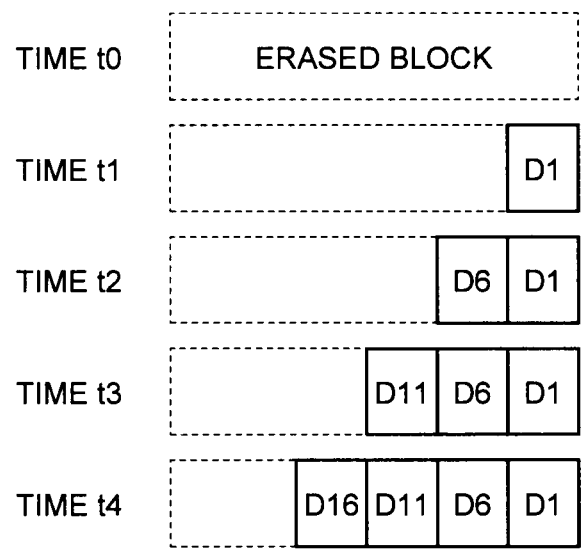
FIG. 12 is a drawing that illustrates a state where pieces of writing target data is written with lapse of time.

FIG. 12 is a drawing that illustrates a state where the divided pieces of data is written as writing target data in the channel CH0 with lapse of time. First, at time t0, a free block is reserved. At time t1, first divided data D1 is written in the first page (at the head or at the end) in the free block reserved at time t0. At time t2, newly-determined divided data D6 is written in the second page in the channel CH0 in the round-robin manner. Similarly, at time t3, divided data D11 is written in the third page. At time t4, divided data D16 is written in the fourth page. In such a manner, pages to which divided pieces of data are written are determined in ascending order in the physical block, regardless of the logical address. Further, the write pointer is set each time writing is performed so as to point a page to which data is written in the ascending order. In the present embodiment, writing operations to the channels are uniformly performed in the round-robin manner, so that the difference between the page numbers pointed by the write pointer in each channel is 1 at the maximum, as shown in FIG. 7. Further, when the writing is finished on the final page in the logical block, the page numbers pointed by the write pointers in the channels are the same.

As explained above, regardless of the value of a logical address specified by a write command from a host, the physical addresses of pages to which writing target data are allocated in a predetermined order, and data is written in the pages.

Figure 11:
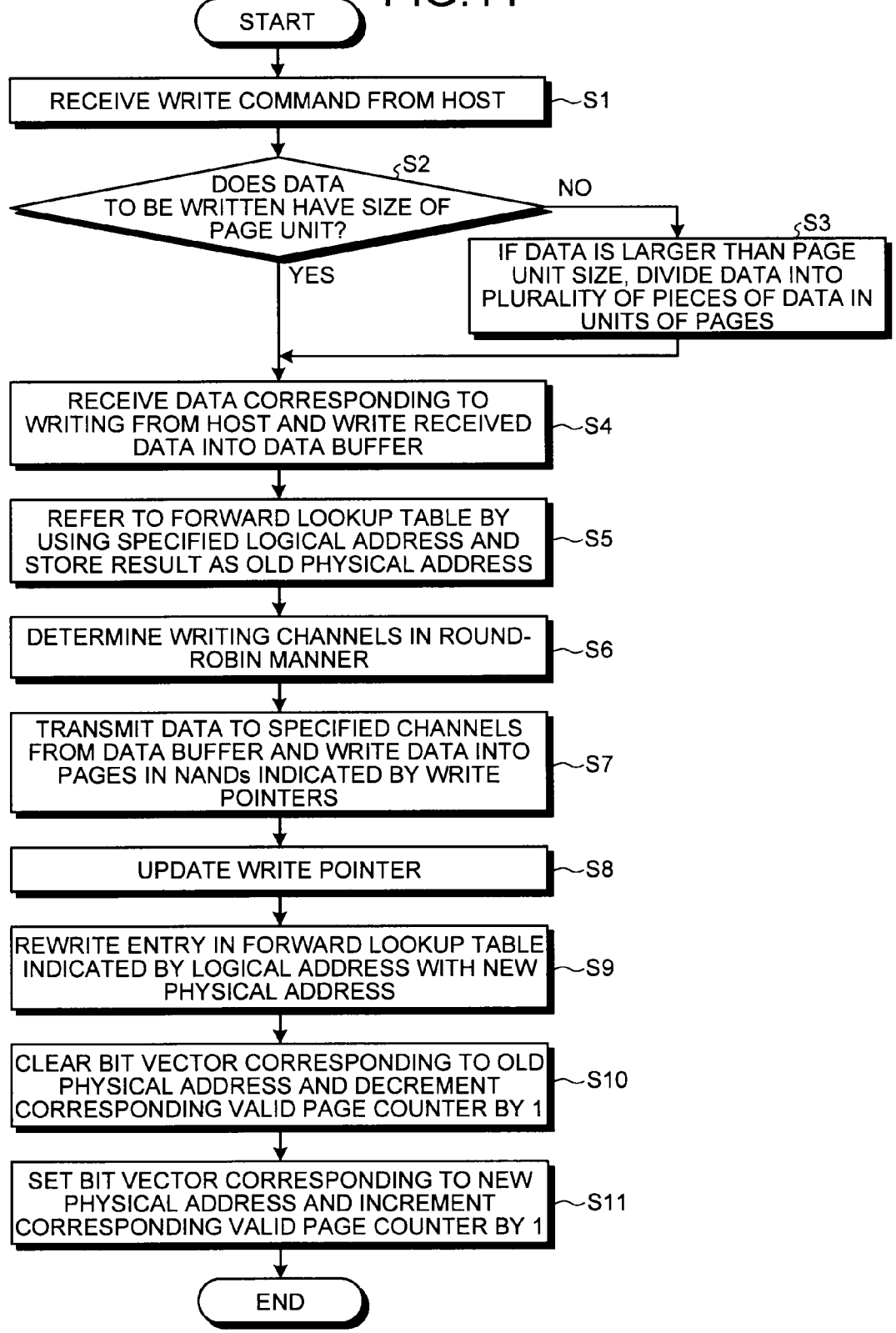
FIG. 11 is a flowchart of procedures of writing the writing target data.

Returning to the description of FIG. 11, as writing target data is written, the semiconductor memory controlling device 50 writes and records, into the forward lookup table, the association between the logical address of writing target data and the physical address of the page to which the writing target data is written (step S9). The specific method for recording the logical address and the physical address has already been explained above. In the case where the writing target data is divided pieces of data, because the divided pieces of data are in units of a page, the semiconductor memory controlling device 50 calculates values obtained by sequentially adding the page size to the specified logical address as the logical addresses of the divided pieces of data. Then, the semiconductor memory controlling device 50 writes and records, into the forward lookup table, the logical address, the channel number of the channel, the physical block number of the physical block, and the page number of the page to which the writing target data is written in the present writing. In the example described above, the page number is indicated by lower six bits of the write pointer before updating, so that the value may be used as the page number. Each time writing of writing target data is performed, the semiconductor memory controlling device 50 updates the forward lookup table.

Further, the semiconductor memory controlling device 50 refers to the bit vector table, sets the value of the bit vector corresponding to the page of the old physical address stored in the SRAM 54 at step S5 to "0", and decrements the value of the counter of the number of valid pages of the physical block that includes the page by 1 (step S10). The old physical address indicates a page to which data is previously written in association with the logical address specified by the write command received at step S1. For this reason, the value of the bit vector is set to "0" and the value of the counter of the number of valid pages in the physical block that includes the page is decremented by 1. Further, the semiconductor memory controlling device 50 sets the value of the bit vector corresponding to the page to which the writing target data is written at step S7 to "1", and increments the value of the counter of the number of valid pages of the physical block that includes the page by 1 (step S11). In this manner, the semiconductor memory controlling device 50 updates the bit vector table as the writing target data is written.

Further, when the write pointer reaches the end of the block in all of the channels (CH0 to CH3) and data becomes unable to be newly written, the semiconductor memory controlling device 50 reserves a free block for each of new channels. Writing divided pieces of data to the new free block is also as described above.

Figure 13:
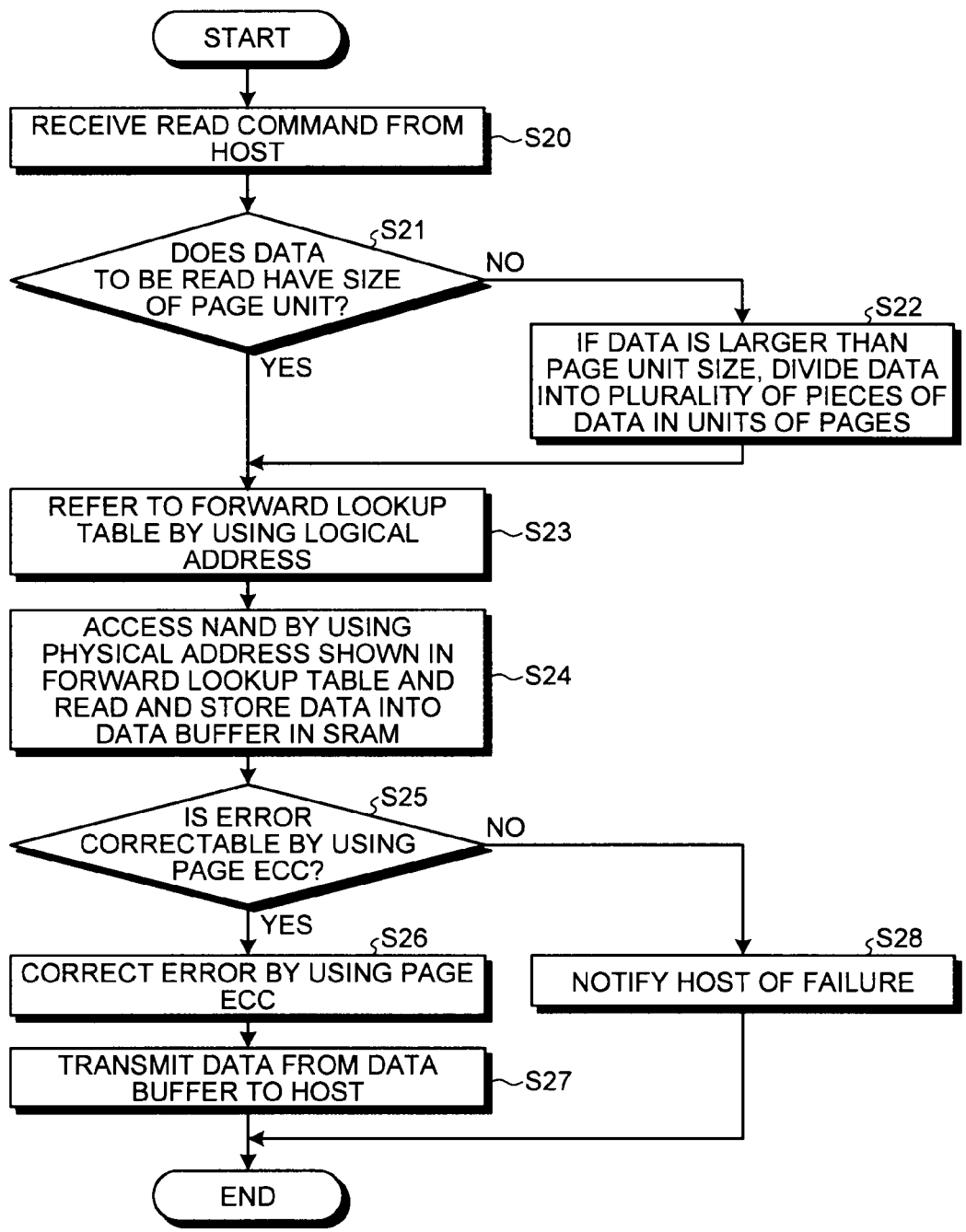
FIG. 13 is a flowchart of procedures of reading data.

Next, procedures of reading data from the NANDs 58 by the semiconductor memory controlling device 50 in accordance with a read command from a host will be explained with reference to FIG. 13. When a read command requesting to read data with a specified logical address is received from the host (step S20), the semiconductor memory controlling device 50 determines whether or not the size of the data requested to be read by the read command is equal to or less than the page size (step S21). In the case where the size of the data is equal to or less than the page size (YES at step S21), the semiconductor memory controlling device 50 refers to the forward lookup table by using the logical address specified by the read command and determines a channel, a physical block, and a page from which the data to be read (step S23). The specific method of determining the channel, the physical block, and the page has already been explained above. After that, the semiconductor memory controlling device 50 reads the data from the NAND 58 corresponding to the determined channel (step S24).

In contrast, in the case where the size of the data requested to be read by the read command is larger than the page size (NO at step S21), the semiconductor memory controlling device 50 divides reading so that data to be read becomes pieces of data in page units. That is, the semiconductor memory controlling device 50 calculates each of the logical addresses of the pieces of data to be read by using the logical address specified by the read command (step S22). Further, the semiconductor memory controlling device 50 refers to the forward lookup table by using each of the calculated logical addresses and determines each of the channels, the physical blocks, and the page from which the data is to be read (step S23). Subsequently, the semiconductor memory controlling device 50 reads the pieces of data from the NANDs 58 corresponding to the determined channels (step S24).

Validity of the data read at step S24 is ensured by a page ECC added to the data. In other words, the semiconductor memory controlling device 50 detects an error in the data and can correct it by using the page ECC added to the read data. However, in the case where there may be an error that cannot be corrected with the page ECC, there is the possibility that a failure occurs in the NAND 58 and abnormality occurs in data. In such a case (NO at step S25), the semiconductor memory controlling device 50 transmits notification information indicating that a failure occurs in the NAND 58 to the host (step S28).

In the case where there is no error in the data read at step S24 (YES at step S25), the semiconductor memory controlling device 50 stores the data in a specified region in the data buffer 67, and advances to step S27. Even in the case where an error in data read at step S24, the semiconductor memory controlling device 50 corrects the data with the page ECC (step S26), stores the corrected data in a specified region in the data buffer 67, and advances to step S27. At step S27, the semiconductor memory controlling device 50 transmits the data stored in the designated region in the data buffer 67 to the host.

When reading of a plurality of pieces of data is requested by a read command received in step S20, the semiconductor memory controlling device 50 may read data from physical blocks of mutually different channels in accordance with logical addresses specified by the command. Because the channels can be independently accessed at the time of reading data as described above, the data can be read in response to a request from the host and transmitted to the host with high responsibility.

Figure 14:
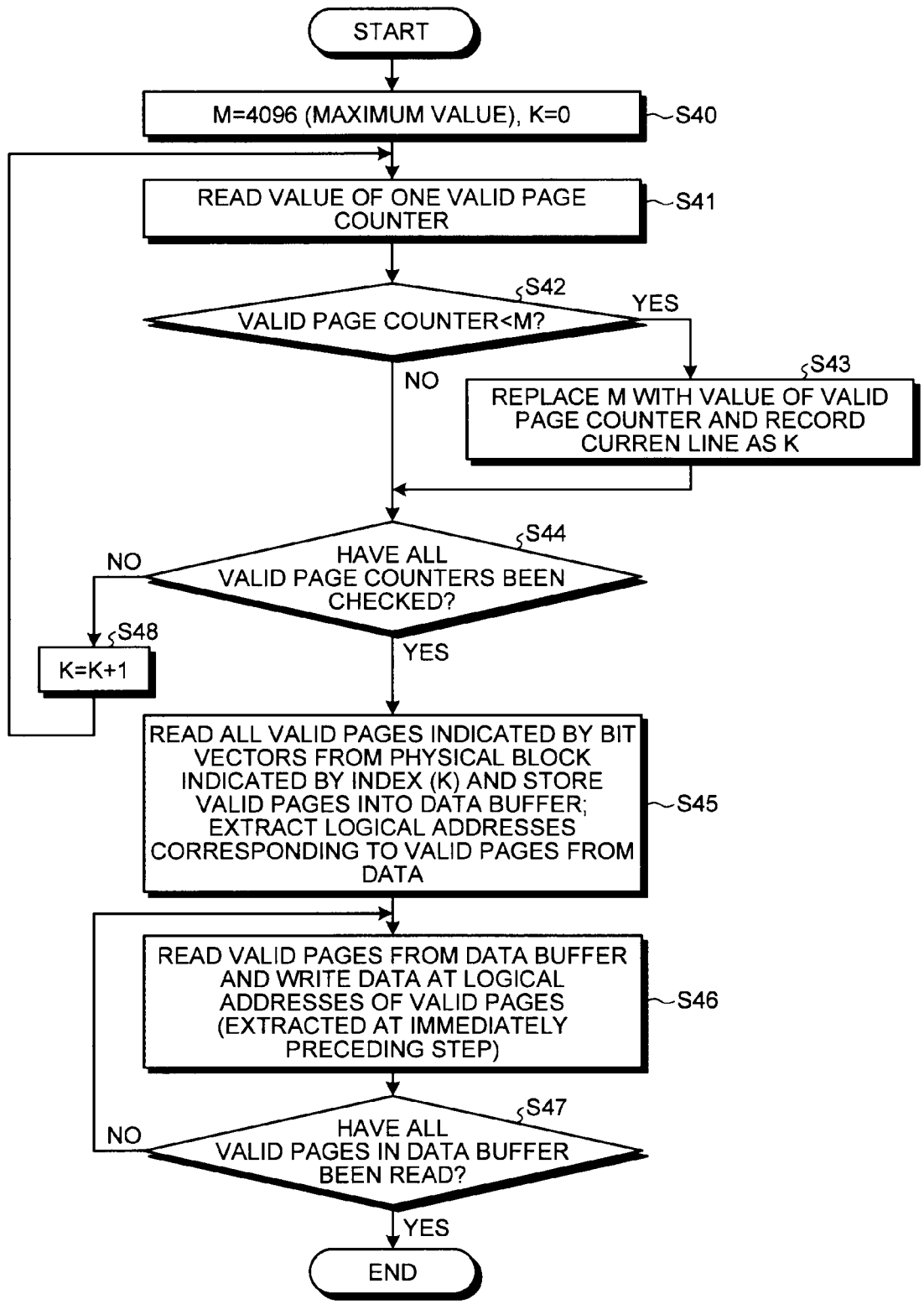
FIG. 14 is a flowchart of procedures in compaction.

Next, procedures of moving valid data written in a physical block to be subjected to compaction to a free block will be explained with reference to FIG. 14. The semiconductor memory controlling device 50 sets "M=4096" as the maximum value of the number of valid pages, and sets "K=0" as an index of the entries of each physical block in the bit vector table (step S40). The semiconductor memory controlling device 50 sequentially reads the values of the counter of the number of valid pages for each physical block one by one by referring to the bit vector table (step S41) and determines whether the value of the counter is smaller than M or not (step S42). In the case where the value of the counter of the number of valid pages is equal to or larger than M (NO at step S42), the device advances to step S44. In the case where the value of the counter of the number of valid pages is smaller than M (YES at step S42), the semiconductor memory controlling device 50 replaces the value of M with the value of the counter and sets the value of the index of the entry with which the value of the counter of the number of valid pages is read at step S41 as K (step S43), and advances to step S44.

At step S44, the semiconductor memory controlling device 50 determines whether or not the value of the counter of the number of valid pages has been read with respect to all of the physical blocks in the bit vector table. In the case where the value of the counter of the number of valid pages has not been read with respect to all of the physical blocks (NO at step S44), the semiconductor memory controlling device 50 increments the value of K by 1 (step S48), and returns to step S41. At step S41, the semiconductor memory controlling device 50 reads the value of the counter of the number of valid pages in the physical blocks that has not yet been read in order of K in the bit vector table. In contrast, in the case where the value of the counter of valid pages has been read with respect to all of the physical blocks (YES at step S44), the semiconductor memory controlling device 50 sets the value of K as the index of a physical block as a candidate to be subjected to compaction. After that, the semiconductor memory controlling device 50 determines data (valid data) stored in a pages (valid page) whose bit vector in the bit vector table indicates "1" with respect to each of the physical blocks indicated by the index K and reads all of the valid data to the data buffer 67. Further, the semiconductor memory controlling device 50 extracts the logical address added to the valid data (step S45).

Subsequently, the semiconductor memory controlling device 50 writes each piece of the valid data read at step S45 in a manner similar to the writing of data performed in response to the write command as described above (step S46). In other words, the semiconductor memory controlling device 50 determines a channel to which the valid data is to be written from the channels CH0 to CH3 in the round-robin manner, and writes the valid data to a page indicated by the write pointer in an erased block in the NAND 58 in the channel. After that, the semiconductor memory controlling device 50 updates the write pointer so as to point a next unwritten page that follows the page to which the valid data is written. The semiconductor memory controlling device 50 writes the association between the logical address added to the written valid data and the physical address of the page in which the valid data is written into the forward lookup table to update the table. The method of updating the forward lookup table is as described above. In the compaction, by updating the forward lookup table in this manner, the association between the logical address and the physical address of data can be always held properly. Further, because a logical address is added to data, the association between the logical address and the physical address in which the data is written can be easily updated in performing the compaction.

When reading from the data buffer 67 of data in all of valid pages loaded to the data buffer 67 is finished (YES at step S47) and the writing to the NAND 58 is finished, the semiconductor memory controlling device 50 performs erasing operation on the physical blocks in the channels CH0 to CH3 that have been selected as candidates to be subjected to compaction, and ends the compaction process.

If there is no valid page, that is, if the value of the counter of the number of valid pages is 0 (at step S42), the semiconductor memory controlling device 50 performs the erasing operation without the reading operation.

The timing of performing the compaction process may be a timing when the number of free blocks that is obtained by a check upon reception of a data writing request becomes equal to or less than a predetermined number.

As explained above, the forward lookup table that shows the association between the logical addresses specified by the host and the physical addresses at which the pieces of data are stored in the semiconductor memory elements is configured by using, in combination, a nonvolatile memory such as the semiconductor memory elements and a volatile memory such as the SRAM, which has a small capacity and is reasonably priced. As a result, it is possible to configure the semiconductor memory controlling device 50 so as not to include DRAMs as volatile memories, besides the SRAM. It is therefore possible to configure the semiconductor memory controlling device 50 at a low cost. Further, because the second table stored in the SRAM 54 as a part of the forward lookup table is used as a cache for the third table stored in the NANDs 58 as a part of the forward lookup table, it is possible to suppress the number of times writing operations are performed on the NANDs 58, while making it possible to completely store the association between the logical addresses and the physical addresses of the data written into the NANDs 58. Consequently, it is possible to inhibit bad impacts caused on the life span of the semiconductor memory system.

In the embodiment, by providing the bit vector table, compaction can be efficiently performed at high speed. To perform compaction, the semiconductor memory controlling device 50 has to identify a valid page in which valid data is written in a block, obtain a logical address corresponding to the valid page, move the valid data, and perform an updating process of associating the logical address with a physical address of a page to which the data is moved. Identification of a valid page and updating of a physical address can be performed via a forward lookup table. However, the forward lookup table is constituted by being optimized to a search using a logical address as an index. For this reason, identification of a valid page and updating of a physical address via the forward lookup table at the time of performing compaction causes increase in penalty in the search time.

A logical block to be subjected to compaction has desirably small number of valid pages. This reason is that, by moving a valid page by compaction, a number of free blocks are obtained. To select a logical block that has small number of valid pages, an entry that has small number of bit vectors having a value of "1" may be selected. To count the number of bit vectors having a value of "1", for example, population computation (counting of the number of bits having a value of "1" in a word) may be provided. However, when the bit width of an entry is large (320 bits in the example), it is difficult to calculate the number of bits in one cycle. For this reason, in the embodiment, the semiconductor memory controlling device 50 updates the value of the counter of the number of valid pages shown in FIG. 5 in accordance with a change in the value of the bit vector. At the time of retrieving a logical block to be subjected to compaction, by retrieving an entry having the smallest number of the counter of valid pages in the bit vector table, the logical block is obtained. An entry in which the value of the counter of the number of valid pages is the smallest can be retrieved by once reading each of the values of the counters of the number of valid pages of entries related to all of the logical blocks. Therefore, in the semiconductor memory controlling device 50 in the embodiment, by referring to the bit vector table, a logical block having small number of valid pages can be easily retrieved, and compaction can be performed efficiently at high speed.

The invention is not limited to the embodiment described above, but may be embodied with various modified components in implementation without departing from the spirit of the inventions. In addition, the invention can be embodied in various forms by appropriately combining a plurality of the components disclosed in the embodiment. For example, some of the components described in the embodiments may be omitted. Further, some components in different embodiments may be appropriately combined.

In the above-described embodiment, various programs executed in the semiconductor memory controlling device 50 may be stored on a computer connected to a network such as the Internet, and provided by being downloaded via the network. The various programs may be recorded in computer-readable recording medium such as a Compact Disk Read-Only Memory (CD-ROM), a flexible disk (FD), a Compact Disk Recordable (CD-R), a Digital Versatile Disk (DVD), or the like, in a form of a file that can be installed or executed, and provided as a computer program product.

In the above-described embodiment, a part of the function of the processor 51 may be implemented by hardware. The semiconductor memory controlling device 50 may have a plurality of processors 51, and the above-described functions may be implemented by the plurality of processors 51. With such a configuration, higher processing speed can be achieved.

In the above-described embodiment, an ECC code is added to each data in a unit of a page as a page ECC. However, the ECC may be added to a unit smaller than a page (for example, a unit of a sector of 512 bytes).

In the above-described embodiment, the number of the NANDs 58 connected to the semiconductor memory controlling device 50 is four. However, the number of the NANDs 58 connected to the semiconductor memory controlling device 50 is not limited to this example.

In the above-described embodiment, the memory connected to the memory controller 53 included in the semiconductor memory controlling device 50 is the SRAM 54. However, the invention is not limited to this example. A DRAM or both an SRAM and a DRAM may be used as the memory. In that situation, a part of the forward lookup table (at least one of the first, the second, and the third tables) may be stored in the DRAM.

In the above-described embodiment, the channels correspond one-to-one to the NANDs 58, but the invention is not limited thereto. The channels may correspond one-to-multiple to the NANDs 58, that is, a plurality of NANDs 58 may be allocated to one channel. In that situation, identification numbers for identifying the respective NANDs 58 are allocated to the NANDs 58. The identification numbers and the physical addresses are recorded in a logical-to-physical translation table, for each block of each channel. For example, in the case where eight semiconductor memory elements are allocated to each channel, a total of 15 bits including 3 bits for identifying the semiconductor memory elements and 12 bits for identifying 4,096 blocks included in each semiconductor memory element are recorded into the logical-to-physical translation table, as the identification number and the physical address of each of blocks of each channel.

In the above-described embodiment, the example is explained in which the bit vectors are used as a method for expressing validity/invalidity of the data and the pages; however, the present invention is not limited to this example. For example, another arrangement is acceptable in which a certain block is selected, and the pages are sequentially selected, so that if a logical address indicating the selected page is present, the page is made valid, whereas if no logical address indicating the selected page is present, the page is determined to be invalid. To determine whether the logical address is present or not, it is acceptable to use a method by which accesses are sequentially made to the forward lookup table to check to see if the selected page is indicated. Alternatively, it is acceptable to structure a reverse lookup table to translate physical addresses into logical addresses and to check to see if a logical address corresponding to a physical address is present.

In the above-described embodiment, it is desirable to perform a compaction process on the third table at appropriate times. Of the entries in the third table, as for the entries indicating the physical addresses at which valid data is stored, the specifying information that specifies the storage region that stores therein the third table including the physical addresses is shown in the entry in the first table. On the contrary, of the entries in the third table, if the specifying information that specifies the storage region that stores therein the third table including the physical addresses is not shown in the entries in the first table, it means that the data stored at those physical addresses is invalid, and also, the entries in the third table are invalid. In the case where the writing process into the third table is performed by using the additional-write method, if the quantity of the invalid entries increases, the capacity (i.e., the writable capacity) of each of the NANDs 58 that is able to realize writing processes becomes small. For this reason, by performing compaction on the third table at appropriate times, it is possible to keep the region used by the third table within a certain level. When the semiconductor memory controlling device 50 performs compaction on the third table and moves valid entries, the semiconductor memory controlling device 50 updates the first table so that the entries in the first table showing the specifying information that specifies the storage regions before moving of the entries now show specifying information that specifies the storage regions after moving of the entries.

To enhance efficiency of compaction and to make smaller the impact thereof that may lower the processing speed of the semiconductor memory controlling device 50, it is desirable to allow the region used by the third table to be large so as to enhance the efficiency of the compaction process.

In the above-described embodiment, the third table is stored in the NANDs 58; however, the present invention is not limited to this example. It is acceptable as long as the third table is stored in a nonvolatile memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor memory controlling device that writes, into a semiconductor memory chip, host write data requested to be written with a specified logical address used by an information processing apparatus, wherein
the host write data includes one or more pieces of first data in predetermined units,
a physical address is information indicating a storage location of the first data within the semiconductor memory chip,
a first table is stored in a first memory,
a second table is stored in a second memory,
a third table is stored in a third memory which is a nonvolatile memory and includes physical addresses each of which indicates a storage location of each of pieces of the first data within the semiconductor memory chip,
the second table is a subset of the third table and includes the physical addresses each of which indicates the storage location of each of pieces of the first data within the semiconductor memory chip, and
the first table includes either information specifying a second table entry or information specifying a third table entry, and
the semiconductor memory controlling device comprises:
a receiving unit configured to receive the host write data;
a controlling unit configured to write each of the pieces of the first data into a storage location in which no data has been written in a storage region from which data has been erased within a storage region of the semiconductor memory chip; and
a recording unit configured to either record the first table into the first memory and the second table into the second memory, or record the first table into the first memory and the third table into the third memory, wherein
when the controlling unit writes the first data into the semiconductor memory chip, the recording unit records the physical address thereof into a storage region that stores therein the second table, and if a predetermined condition is satisfied, the recording unit records the physical address included in the second table into a storage region that stores therein the third table, the predetermined condition being a condition that a size of a plurality of entries that have been written into the storage region that stores therein the second table is a multiple of a size of the predetermined units.

2. The semiconductor memory controlling device according to claim 1, wherein if the predetermined condition is satisfied, when the recording unit records the physical address included in the second table into the storage region that stores therein the third table, the recording unit merges the physical address with another physical address that has already been stored in a first storage region that records therein the physical address within the storage region that stores therein the third table so as to record, into the first storage region, the physical addresses that have been merged.

3. The semiconductor memory controlling device according to claim 1, wherein
the first table includes either first specifying information that specifies each of storage regions that store therein the physical addresses within a storage region that stores therein the second table or second specifying information that specifies each of storage regions that store therein the physical addresses within a storage region that stores therein the third table, and
when the host write data with a first logical address specified by the information processing apparatus is received and the first table already includes the second specifying information, the recording unit records the physical addresses stored in the storage regions specified by the second specifying information into the storage region that stores therein the second table and records the first specifying information that specifies the storage regions that store therein the physical addresses into the storage region that stores therein the first table.

4. The semiconductor memory controlling device according to claim 1, wherein the recording unit records the physical addresses into the storage region that stores therein the third table by writing the physical addresses into storage locations in which no data has been written in a storage region from which data has been erased within the storage region that stores therein the third table.

5. The semiconductor memory controlling device according to claim 4, wherein
the first table includes either first specifying information that specifies each of storage regions that store therein the physical addresses within a storage region that stores therein the second table or second specifying information that specifies each of storage regions that store therein the physical addresses within a storage region that stores therein the third table, and
the recording unit further performs garbage collection by writing a second physical address into a new storage region from which data has been erased within the storage region storing therein the third table, the second physical address having been stored in a storage region that is not specified by the second specifying information associated with the information included in the first table.

6. The semiconductor memory controlling device according to claim 1, wherein the third table is stored in the semiconductor memory chip.

\* \* \* \* \*